United States Patent [19]

Schindler

[11] 4,013,848

[45] Mar. 22, 1977

[54] SPRING SHORTING MEANS FOR PHOTOFLASH ARRAY

[75] Inventor: Donald R. Schindler, Burton Township, Ohio

[73] Assignee: General Electric Company, Schenectady, N.Y.

[22] Filed: Jan. 2, 1975

[21] Appl. No.: 538,037

[52] U.S. Cl. .............................................. 200/51.1
[51] Int. Cl.² ...................................... H01R 13/70
[58] Field of Search ........... 200/51.1, 51.11, 51.03, 200/51.05, 153 M; 339/19; 240/1.3

[56] References Cited

UNITED STATES PATENTS

| | | | |
|---|---|---|---|
| 2,188,725 | 1/1940 | Riggs | 200/51.11 |
| 2,811,845 | 11/1957 | Schwartz et al. | 200/51.1 |
| 3,370,140 | 2/1968 | Betts | 200/51.1 |

Primary Examiner—David Smith, Jr.
Attorney, Agent, or Firm—Norman C. Fulmer; Lawrence R. Kempton; Frank L. Neuhauser

[57] ABSTRACT

A photoflash lamp array having electrical terminals adapted to be connected to a camera socket. A spring member, in contact with one terminal, normally engages against a shoulder of another terminal, for shorting the terminals when the array is out of a socket. This reduces the possibility of accidental flashing of lamps in the array when a connector terminal is touched by a person or object having an electrical potential such as an electrostatic voltage charge. When the array is plugged into a socket, the socket lifts the spring member out of contact with the shoulder of the terminal and removes the short.

9 Claims, 7 Drawing Figures

U.S. Patent   Mar. 22, 1977   4,013,848
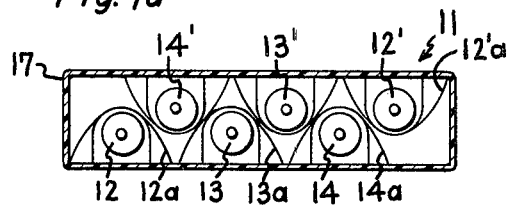
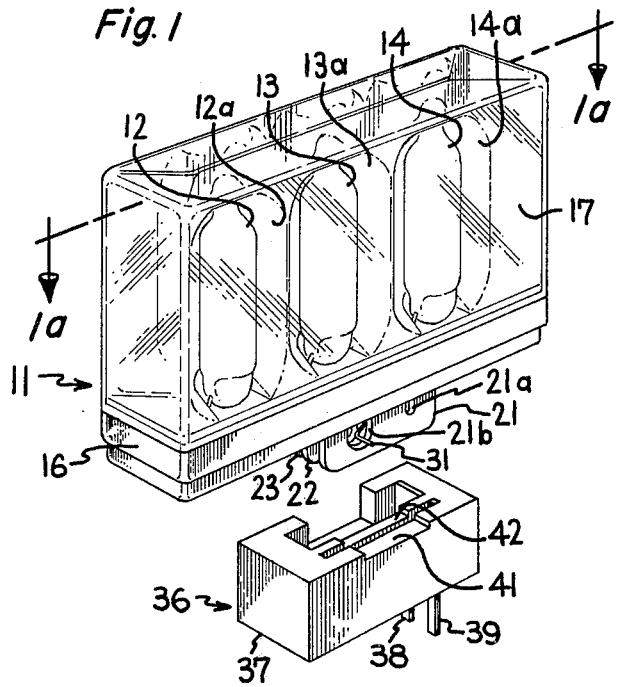
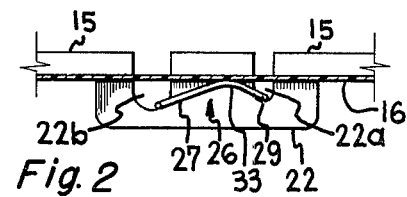
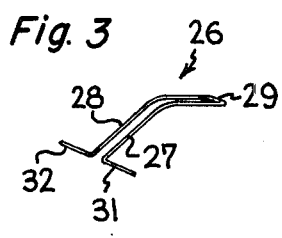
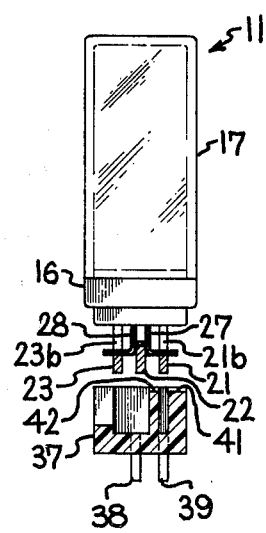
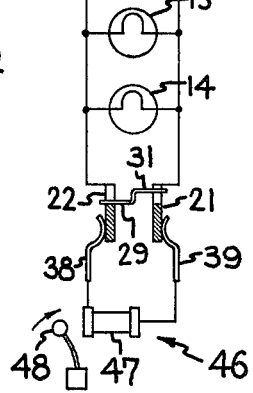
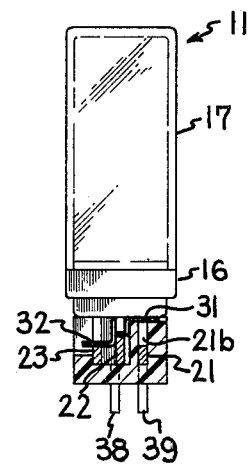

4,013,848

SPRING SHORTING MEANS FOR PHOTOFLASH ARRAY

CROSS-REFERENCES TO RELATED APPLICATIONS

Ser. No. 485,422, filed July 3, 1974, Paul T. Cote', "Multiple Flash Lamp Unit", assigned the same as this invention.

Ser. No. 485,460, filed July 3, 1974, Paul T. Cote', "Protective Terminal for Multiple Flash Lamp Unit", assigned the same as this invention.

Ser. No. (Docket LD 5776), Paul T. Cote', filed concurrently herewith, "Photoflash Array Having Electrical Shorting Means", assigned the same as this invention.

BACKGROUND OF THE INVENTION

The invention is in the field of photoflash lamp arrays.

Various photoflash arrays have been proposed, and at least one type is now commercially available, containing a plurality of flash lamps. The arrays are provided with terminals for connecting the lamps, or lamp sequencing circuitry in the array, to a camera socket which provides a firing pulse (in synchronism with opening of the camera shutter) to the array for flashing a flash lamp when a flash picture is desired. Several flash pictures may be taken without moving or removing the array. A type of flash array having multiple connector terminals for connecting the flash lamps to a firing circuit in a camera is disclosed in U.S. Pat. Nos. 3,598,984 to Stanley Slomski and 3,598,985 to John Harnden and William Kornrumpf, and a type of flash array containing sequential lamp flashing circuitry and thus requiring only two connector terminals for connecting the array to a source of firing voltage pulses is disclosed in U.S. Pat. Nos. 3,532,931 to Paul Cote' and 3,668,421 to Harry Bowers. Some of the just-referenced patents also disclose dual-sided arrays having a first group of lamps at the front of the array and a second group of lamps at the back of the array. The array is plugged into a camera with one of the groups of lamps facing frontwardly, and when these lamps have been flashed, the array is turned around and the lamps of the other group are flashed.

The flash lamps in an array may be a low-voltage type requiring a voltage pulse of about 3 volts to 15 volts, for example, or may be a high-voltage type requiring, for example, a firing pulse of about 100 to 2000 volts or more or low energy. An example of a high-voltage flash lamp and a piezoelectric firing pulse source which produces a firing pulse when a piezoelectric element is impacted in synchronism with the opening of a camera shutter is disclosed in U.S. Pat. Nos. 2,972,937 and 3,106,080 to C. G. Suits. Flash arrays, and particularly if they employ high-voltage types of flash lamps which are flashed by a high-voltage pulse of low energy, are prone to accidental electrostatic firing of one or more lamps if a connection terminal of the array is touched by a person or object having an electrostatic charge. Also, in a dual-sided array, there is a possibility of accidentally flashing a lamp in the back group by induced voltage when a lamp in the front group is flashed.

SUMMARY OF THE INVENTION

Objects of the the invention are to provide an improved multiple flash lamp array; to provide means for preventing accidental flashing of lamps in such an array; and to provide such accidental flash prevention in a manner that is feasible and economical to manufacture.

The invention comprises, briefly and in a preferred embodiment, a multiple flash lamp array having a group of flash lamps and having connector terminals for connecting the array to a socket of a camera or flash adapter unit. The terminals are connected to the flash lamps in the array directly, and/or indirectly by way of sequencing switching circuitry. Spring shorting means, such as a wire, is in contact with one terminal and normally engages downwardly against a shoulder on another terminal, thus normally shorting the terminals. This reduces the possibility of accidental flashing of lamps when a connector terminal is touched by a person or object having an electrostatic voltage charge. When the array is plugged into a socket, the socket lifts the spring member from the shoulder. In a preferred embodiment, the shoulder is in the form of an opening through a terminal, and the shorting means is a wire shaped to enter the opening and rest against an edge thereof. In a dual-sided array, only the frontwardly facing group of lamps becomes unshorted when the array is connected to the socket.

BRIEF DESCRIPTION OF THE DRAWING

FIG. 1 is a front perspective view of a flash lamp array and socket in accordance with a preferred embodiment of the invention.

FIG. 1a is a cross-sectional view of FIG. 1 taken on the line 1a—1a thereof.

FIG. 2 is a front detail view of the shorting wire and a terminal in the arrangement of FIG. 1.

FIG. 3 is a perspctive view of the terminal-shorting wire.

FIG. 4 is a side view of the flash array and socket.

FIG. 5 is a side view of the array plugged into a socket.

FIG. 6 is an electrical schematic diagram of a group of flash lamps in the array, connected via a socket to a piezoelectric element which functions as a source of firing pulses for the lamps.

DESCRIPTION OF THE PREFERRED EMBODIMENTS

The general arrangement of flash lamps, reflectors, and housing to form the flash array 11 is like that of the above-referenced Bowers patent, but the invention is not limited to any particular type of general construction arrangement. A first group of flash lamps 12, 13 and 14 are arranged in a row toward the front of the array, and are respectively provided with reflectors 12a, 13a and 14a arranged to direct light from the lamps, when flashed, frontwardly of the array 11. A similar group of flash lamps 12', 13' and 14' are arranged toward the back of the array, and are respectively provided with reflectors 12'a, etc., to direct light from that side of the array when flashed. The terms "front" and "back" of the array are used in the relative sense, because this particular array is a dual-sided array and can be plugged into a socket with either side facing frontwardly, and only the lamps facing frontwardly will be flashed, whereupon the array is turned around and the then frontwardly facing lamps are flashed. The lamps are connected by their lead-in wires to electrical conductors 15 carried in a base 16 of the array, and a transparent cover 17 which can be made of plastic, as can be the base 16, is positioned over the lamps and reflectos and attached to the base 16. The cover 17 may be clear or may be provided with a bluish or other color tint to provide color correction for the flash lamps in well-known manner.

Tab-like electrical connector terminals 21, 22 and 23 extend downwardly and side by side from the base 16, and may be connected to the lamps in the array in the manner shown in FIG. 6 as will be described. The center terminal 22 is connected electrically in common to all of the flash lamps of the array, or to sequencing circuitry for all of the lamps in the array, including both the "front" and "back" groups of lamps. The terminal 21 is connected to lead-in wires of the "front" groups of lamps 12, etc., or to sequential firing circuitry for this group of lamps, and the terminal 23 is connected to lead-in wires of the "back" group of lamps 12', etc., or to sequential firing circuitry for this group of lamps.

In accordance with the invention, a spring member 26, which may comprise a resilient wire, electrically connects the center common terminal 22 with each of the outer terminals 21 and 23. As has been explained, this prevents accidental flashing of lamps when a terminal is touched by a person or object having an electrostatic voltage charge or when rearwardly facing lamps receive induced voltage from the frontwardly facing lamps. In the embodiment shown, the wire spring member 26 is bent in a hairpin or U-shape having the legs 27, 28 thereof substantially parallel and close together. The apex 29 of the spring member 26 passes through an opening 22a in the center terminal 22, and the legs 27 and 28 flank the terminal 22 and extend substantially horizontally beneath the base 16. The open ends of the U-shaped wire are bent to form outwardly extending lateral offsets 31 and 32 which respectively extend through openings 21b and 23b in the outer terminal blades 21 and 23. The central region 33 of each of the legs 27, 28 is curved upwardly to abut against the underside of the base 16 thereby forcing the apex 29 of the member 26 laterally down against the edge of the opening 22a of the center terminal 22, and also forcing each of the lateral extensions 31 and 32 respectively laterally down against the edges of the openings 21b and 23b of the terminal tabs 21 and 23, thus electrically connecting and shorting each of the outer terminals 21 and 23 to the center common terminal 22. As a manufacturing economy measure, each of the terminals 21, 22, and 23 and their integral conductors 15 is stamped out identically so that each has an opening 21a and 21b, 22a and 22b, etc., although only the openings 21b, 22a, and 23b are utilized. These openings may be in the form of holes, or slots as shown.

The arrangement of the shorting spring member 26, shown in the drawing and described above, has the advantage of not requiring any welding or other means for attaching the member 27 to a terminal. Optionally, however, the dual spring member can be welded or otherwise attached near its apex 29 to the center terminal 22, or two individual spring members can be employed, and need not abut against the underside of the base 16. Spring-loaded rigid levers can be used instead of resilient wire. Also, it will be noted that the openings 21b and 23b function as shoulders against which the spring wire lateral offsets lie, and these shoulder openings can be replaced by inwardly extending shoulder members on the terminals 21 and 23, in which case the lateral offsets 31 and 32 could be eliminated, and the free ends of the spring wire would rest laterally downwardly against the tops of the extending shoulders. Thus, the term "shoulder" herein includes shoulder openings, extending shoulders, and equivalent surfaces against which the spring member normally rests.

A socket 36, which may be part of a camera or of a flash adapter unit, is constructed to receive the connector terminals 21, 22, and 23 of the array 11, and comprises a body 37 which may be of plastic, and a pair of socket contacts 38 and 39 which respectively electrically engage the center common array terminal 22 and whichever of the other terminals 21 and 23 is associated with the frontwardly facing groups of lamps that are to be flashed.

In accordance with the invention, the socket 36 is provided with one or more surfaces 41, 42 positioned to be engaged by the lateral offset 31 (or 32, depending on which side of the array faces frontwardly) as the array is being plugged into the socket whereby the offset 31 (or 32) is lifted away from the terminal shoulder 21b (or 23b), thus unshorting the front group of lamps so that they can be flashed by firing voltage pulses (FIGS. 5, 6). Terminology herein regarding the socket surfaces 41 and 42 is intended to include equivalently functioning surfaces such as on a camera or flash adapter unit. These surfaces do not necessarily have to be level nor horizontal. The rear group of lamps remains shorted because there is nothing provided at the socket to unshort the rear lateral offset 32 (or 31) from its terminal shoulder 23b (or 21b), thus preventng accidental flashing of any lamps in the rear group.

The socket contacts 38 and 39 are connected to a firing pulse source 46, which may comprise a piezoelectric voltage-generating element 47 as shown in FIG. 6. An impactor 48 is arranged to impact against and deform the piezoelectric element 47 in synchronism with the opening of a camera shutter, thus generating a firing voltage for flashing one of the flash lamps in the array 11, as disclosed in the above-referenced Suits patents. When the frontwardly facing lamps have been flashed, the array is turned around whereby the remaining lamps face frontwardly and are connected to be flashed.

In the electrical circuit embodiment shown in FIG. 6, all of the lamps 12, 13, 14 of the "front" group of lamps are connected in electrical parallel to the array terminals 21 and 22. Similarly, the "rear" group of lamps 12', 13', 14' are connected electrically in parallel with the terminals 22 and 23. In such an arrangement, the lamps 12, 13, 14, etc., of the parallel connected group flash at differing firing voltages, for example in steps of a few hundred volts, achieved by design or by random variation, whereupon the first firing pulse flashes the lamp having the lowest firing voltage characteristic, etc.

As shown in the drawing, and in accordance with a feature of the invention, the terminals 21, 22 and 23 of the array and the contacts 38 and 39 of the socket are arranged so that as the array 11 is being plugged into the socket 36, the terminals 21 and 22 (or 22 and 23 if the array is turned around) momentarily short across the contacts 38 and 39 prior to the front terminals being unshorted by the socket surfaces 41, 42, so as to short out and discharge any residual voltage charge which may be in the firing pulse source 46. Such a residual or remanent voltage charge can occur, for example, when the piezoelectric element 47 is impacted and stressed during a non-flash picture. This may cause a voltage breakdown to occur within the piezoelectric element, and upon unstressing of the element after the impact, it will produce a reverse voltage and will then retain a residual voltage of opposite polarity from the impact-produced pulse. This residual voltage can remain long enough and at a high enough voltage to flash a lamp when the lamp or a unit containing the lamp is plugged into the socket.

Four or five or more lamps can be provided in each of the groups of lamps. Also, a one-sided flash array can be employed, utilizing the invention, instead of the dual-sided array that has been described.

The invention achieves its objectives of providing a flash array in which the lamps cannot be accidentally flashed by electrostatic voltage charges when the connector terminals are touched by a person or object having an electrostatic charge. Also, the invention achieves additional benefits of temporarily shorting the firing pulse source as the array is being plugged into a socket, thereby discharging any residual voltage charge in the firing pulse source. Also, in the case of a dual-sided array as has been described, the invention continues to electrically short the rearwardly facing group of lamps when the array is plugged into a socket, thereby preventing any accidental flashing of a rearwardly facing lamp.

While preferred embodiments and modifications of the invention have been described, various other embodiments and modifications will become apparent to persons skilled in the art, and will fall within the scope of the invention as defined in the following claims.

What I claim as new and desire to secure by Letters Patent of the United States is:

1. A flash lamp array comprising a body portion containing a plurality of flash lamps and having at least two electrical terminals extending downwardly from the underside of said body portion and being substantially mutually parallel and spaced apart from each other and adapted to be inserted into a socket having a surface, at least a first one of said terminals being provided with a lateral shoulder, and a resilient elongated member positioned below and substantially parallel to said underside of the body portion of the array and connected electrically to a second one of said terminals and engaging resiliently against said shoulder so as to normally short-circuit said first and second terminals, said resilient elongated member being positioned to engage said surface of the socket and be lifted out of engagement with said shoulder when said array is plugged into said socket.

2. An array as claimed in claim 1, in which said resilient elongated member comprises a wire.

3. An array as claimed in claim 1, in which said lateral shoulder of said first terminal comprises an opening laterally through said first terminal.

4. An array as claimed in claim 2, in which said second terminal is provided with an opening therethrough, said resilient wire member being U-shaped with the apex thereof passing through said opening, the legs of said U-shaped wire member being shaped to engage said underside of the body member so as to force said apex against the bottom edge of said opening and to force one leg of the wire member against said shoulder.

5. An array as claimed in claim 4, in which said lateral shoulder comprises an opening through said first terminal, said leg being provided with a lateral offset near the end thereof, said lateral offset extending through said opening of the first terminal and resiliently engaging against the bottom part thereof.

6. An array as claimed in claim 5, adapted to be plugged into a socket having a top surface, said lateral offset being positioned to engage said top surface of the socket and be lifted out of engagement with said first terminal when said array is plugged into said socket.

7. An array as claimed in claim 6, in which said socket is provided with a pair of contacts adapted to respectively engage said first and second terminals of the array, said lateral offset of the resilient wire member being positioned so that said terminals engage and temporarily short-circuit said socket contacts prior to said lateral offset being lifted from engagement with said first terminal.

8. An array as claimed in claim 6, having first and second groups of lamps arranged to emit light from opposite sides of the array, said first and second terminals being connected in the array to cause flashing of said first group of lamps in response to firing voltage applied to the terminals, and a third terminal extending downwardly from said underside of the body portion substantially parallel and spaced apart from said second terminal on the other side thereof from said first terminal, said second and third terminals being connected in the array to cause flashing of said second group of lamps in response to firing voltage applied to said second and third terminals, said third terminal being provided with an opening therethrough, the remaining leg of said wire member being provided with a lateral offset near the end thereof and extending through said opening of the third terminal and resiliently engaging against the bottom part thereof, said array being adapted to be plugged into said socket with either of said groups of lamps facing a given direction and with either said first and second terminals or said second and third terminals engaging said pair of socket contacts.

9. An array as claimed in claim 8, in which only the one of said lateral offsets of the wire member associated with the group of lamps facing said given direction is lifted out of contact with a terminal by said top surface of the socket.

* * * * *